Feb. 14, 1956 S. STANDAL 2,734,534
INSERTED SAW TOOTH WITH CHIP DEFLECTING LIP
Filed Aug. 8, 1952 2 Sheets-Sheet 2
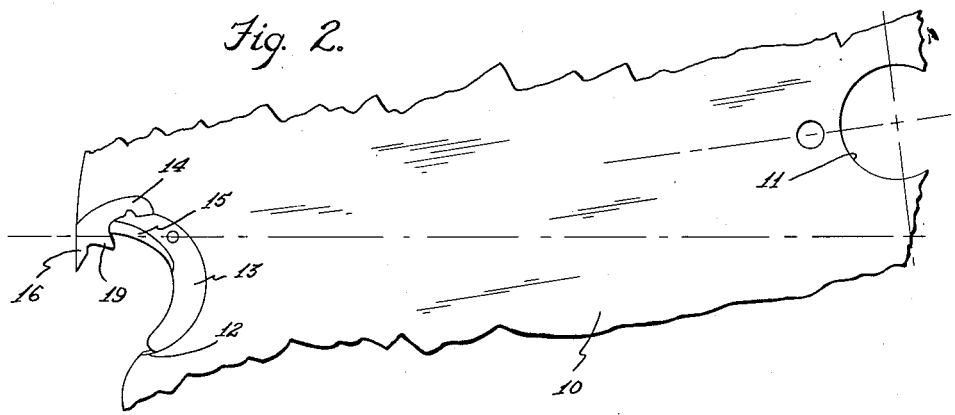
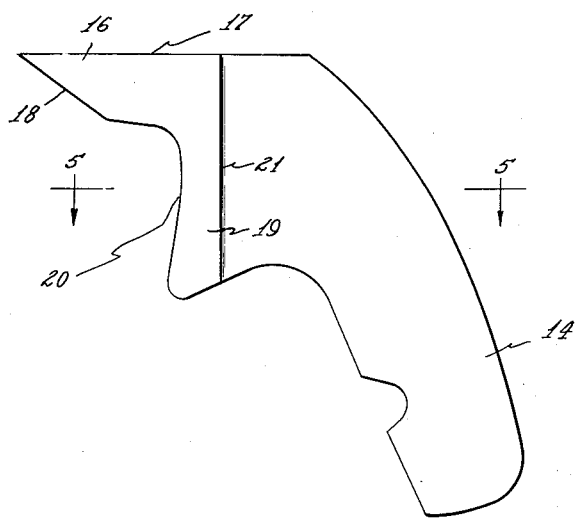
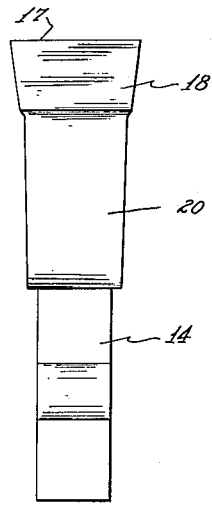
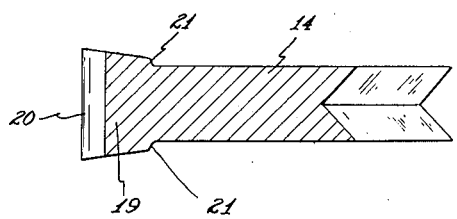
INVENTOR.
Stanley Standal
BY
Greek Wells
Atty.

United States Patent Office 2,734,534
Patented Feb. 14, 1956

2,734,534
INSERTED SAW TOOTH WITH CHIP DEFLECTING LIP

Stanley Standal, Spokane, Wash.

Application August 8, 1952, Serial No. 303,279

3 Claims. (Cl. 143—151)

The present invention relates to saw teeth for circular saws and particularly to inserted saw teeth. It is the purpose of the present invention to provide an inserted saw tooth with means to cause chips, when cut by the chisel point of the inserted tooth, to be deflected forwardly and brought up to approximately the speed of the saw before they fall down into the gullet which carries the sawdust out of the log.

Heretofore, inserted chisel type saw teeth have in general been so constructed that they direct the chips cut by the chisel point of the tooth inwardly into the gullet along a smooth curved path. The relative speed of the cutting edge with respect to the log is quite high. For example, in modern sawing when a circular saw is in motion the tooth travels toward the chip at a velocity as high as 166 feet per second. The chips cut from the wood are deflected inward toward the bottom of the gullet and strike the advancing face of the shank which in turn must bear the brunt of deflecting the chip and bringing it up to saw speed. It is well known that the shanks wear rapidly just below their junction with the tooth. The chips strike this part of the shank at a very high velocity, causing an explosive action which powders some of the chips, especially if they are frozen. In cutting frozen logs, the powdered material slips past the shank and is driven tight against the side of the cant where it freezes to the cant. This traps larger chips and the saw is deflected so as to crowd to one side or the other and spoil the lumber.

Various means have been employed to protect the shank at the point of wear. For example, in U. S. Patent No. 1,936,242, a thickened face 25 is provided on the shank in an attempt to protect against this wear. A later patent, U. S. No. 2,334,928 illustrates the use of hardening facing on the shank to avoid the wear. In a saw of the inserted tooth type, the teeth are used up quite rapidly by wear on the cutting edge and by sharpening. The shanks are more costly and should wear out many sets of teeth. It is essential therefore, to eliminate as much as possible, the wearing of the shanks because they must carry away the sawdust and if they too are worn rapidly, it means that the heavy cost of rebuilding and replacing shanks frequently must be borne.

My invention contemplates the provision of an inserted tooth structure which will give the chips a forward impetus at a point as close as possible to the chisel face, a forward motion that will bring them up to saw speed so that they may thereafter settle gently into the gullet. More specifically I propose to build a deflecting surface at the lower front edge of the tooth which will protrude far enough forward of the shank and will have sufficient area that it will divert the chip from its natural path forwardly in line with the motion of the saw without turning it edgewise of the saw so that the chip is moved gradually into the gullet instead of striking the shank with explosive force.

My invention is particularly applicable to circular saws when used in cutting frozen logs. The tendency of the saw in cutting frozen logs is to crowd out of line, apparently because there is a build up between the saw and the cant, of chips and ice so that the advancing teeth are deflected from the true path they should take. As I have pointed out hereinbefore, the explosive force with which the chips strike the shank in present day inserted tooth saws, causes a powdering of the chip to a certain degree and the powdered material slips by the shank quite readily so that it may act as an adhesive to aid in cementing a larger chip that may slide by the shank to the cant. By providing the front edge of the tooth with a deflecting surface close to the chisel face of the tooth, which surface makes a sufficient angle forwardly and inwardly, the chip leaving the chisel face is immediately picked up by this surface and diverted inwardly and forwardly. In this way the explosive powdering action is reduced and the chips are speeded up to saw velocity before they have an opportunity to turn edgewise. It is an important feature of my invention that the surface forming portion at the lower front edge of the tooth be widened to substantially the width of the chisel portion of the tooth where they meet. Accordingly it is a purpose of my invention to provide an inserted saw tooth of the chisel type with an inwardly protruding lip of substantially the same width as the base of the chisel portion of the tooth, the front surface of which lip serves as a deflector and overhangs the shank to divert the incoming chips forwardly into the gullet before they contact the shank.

The nature and advantages of my invention will appear more fully from the following description and the accompanying drawings illustrating a preferred form of the invention. It should be understood however, that the drawings and description are illustrative only and are not intended to limit the invention except insofar as it is limited by the claims.

In the drawings:

Figure 2 is a view on a reduced scale of a segment of an inserted tooth saw illustrating the position of the tooth with respect to the saw eye;

Figure 3 is an enlarged view in side elevation of an inserted saw tooth embodying my invention;

Figure 4 is a face view of the tooth shown in Figure 3, looking at Figure 3 from the left; and Figure 5 is a sectional view taken on the line 5—5 of Figure 3.

Figure 1:
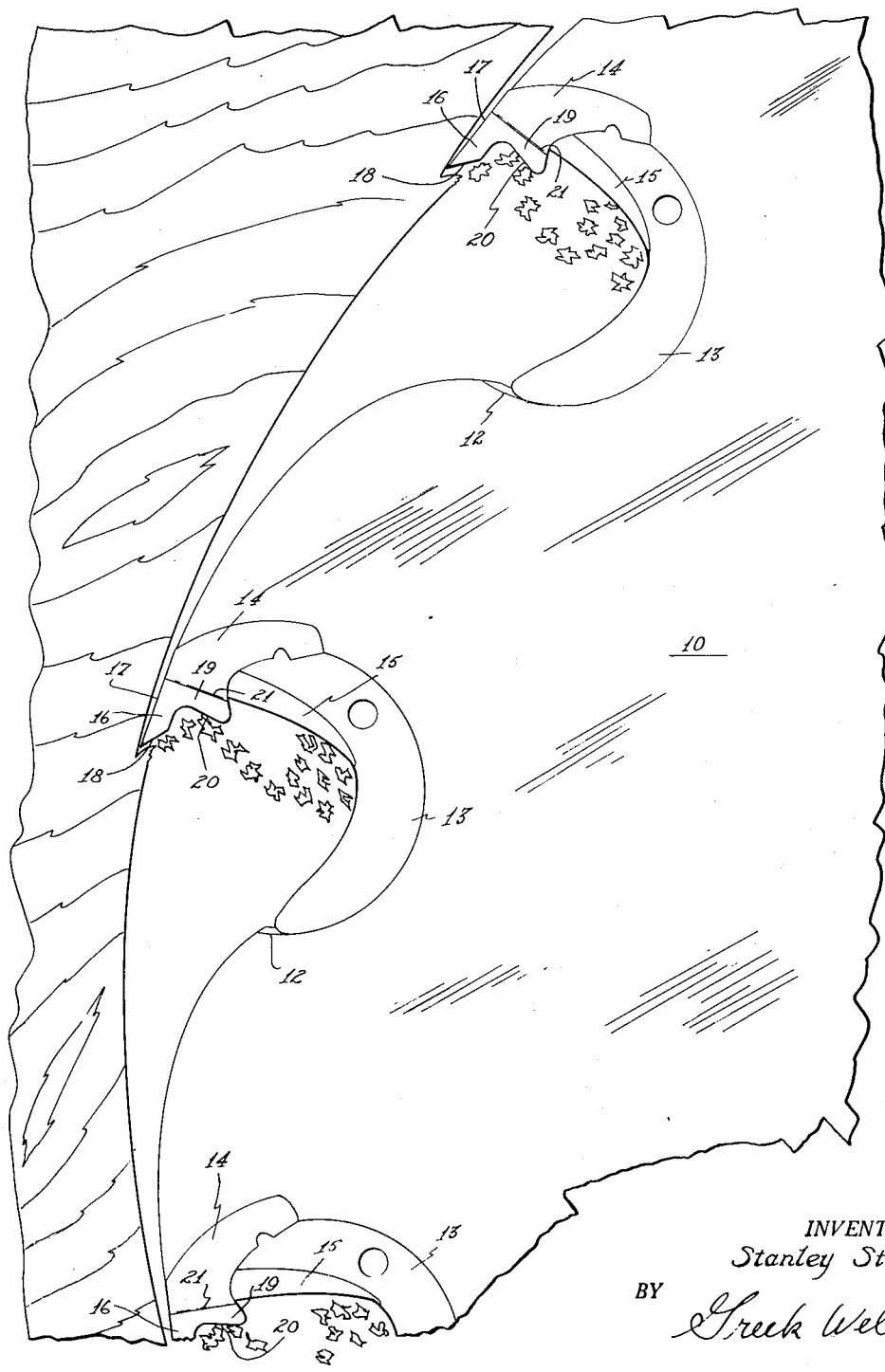
Figure 1 is a side view of a portion of a circular saw showing how it enters the wood, the saw being equipped with inserted teeth made according to my invention.

Referring now in detail to the drawings, the numeral 10 is used to designate a circular saw, the eye of which is shown at 11 in Figure 2. This saw has in its periphery recesses 12 in which to insert shanks 13 and teeth 14. It is usual in circular saws to make the shanks 13 of essentially the same thickness as the saw except that, the portion 15 of the shank adjacent to the tooth is thickened slightly and in many cases faced with a hard material so that it will withstand the extreme wear. My improved tooth 14 has a chisel portion 16 of conventional formation and size so that when it is fitted in the saw with the shank 13, the outer surface 17 of the chisel portion will recede inwardly from a circle through the tips of the teeth a certain amount at a measured distance back from the cutting edge of the tooth. This is one way in which the amount of penetration of the tooth into the wood can be controlled. If for example, the outer face of the tooth recedes less, the saw cannot advance so rapidly through the log for a given speed of rotation. About 5/64 in. to 3/32 inch inward recession at ½ inch back from the cutting edge of the tooth is commonly used.

The advancing face 18 of my improved tooth 14 is worn away and filed away as the tooth is used, just as in teeth of conventional design. It will be noted however, that at the base of the chisel portion 16 of my improved saw tooth, there is an inwardly extending lip 19 which is of substantially the same width as the base of the chisel portion 16. This lip provides the lower front edge of the tooth and it overhangs the outer end portion 15 of the shank 13. The front face 20 of the lip 19 is inclined forwardly toward the inner end of the lip with respect to the back edge 21 of the lip. A slight concavity of the front face 20 is indicated in Figure 3. This curve is sufficient to cause the chips and dust to move inward smoothly and to avoid packing of fine sawdust at the outer end of the front face 20. I have found it advisable to make the back edge 21 of the lip 19 substantially perpendicular to the outer face 17 of the tooth 14 and a rough indication of the angularity of the front face 20 with respect to the back edge 21 is that it is about 4 degrees. The back edge 21 is not exactly on a radius of the saw. If extended the line of the back edge 21 would pass in front of the eye of the saw as indicated in Figure 2 of the drawings. The thickness of the lip circumferentially of the saw is merely enough to provide strength and enough material to stand the wear for life of the tooth. The chisel portion and the lip are tapered slightly from the outer face of the tooth as indicated in Figure 4.

The way in which my improved tooth operates to divert the chips is indicated roughly in Figure 1. As the chips are cut away from the log, they are wedged inwardly by the advancing face 18 of the tooth and they strike the front surface 20 of the lip 19 almost instantly. The angle of the surface 20 with respect to the face 18 is approximately 120 degrees on a new tooth. The chips therefore will be deflected forwardly and inwardly and brought substantially to the speed of the saw. They then settle down into the gullet provided by the shank 13, due to their frictional engagement with the cant, and they are carried out of the log in the usual manner. With this construction the chips are caught and diverted forwardly and inwardly before they have a chance to turn edgewise and wedge past the shank. When they are once brought to the approximate speed of the saw, they will be carried forward much more readily and have less tendency to slip past the shank. The powdering and splitting of chips is reduced because of the wide face 20 and its closeness to the face 18.

The nature and advantage of my invention are believed to be clear from the foregoing description. Teeth embodying my invention are inserted in circular saws in the same manner as the chisel teeth now commonly used in inserted tooth circular saws. They require no change in the manner of filing or sharpening the teeth. Each tooth embodying my invention includes an inwardly protruding lip, the width of which is considerably greater than the width of the saw and shank and substantially as great as the width of the base of the chisel portion of the tooth. This protruding lip is narrow, circumferentially of the saw, to cause a minimum of friction against the adjacent wood. The lip overhangs the outer end of the shank. The front deflecting face of the lip is concaved slightly and is directed inward at about 120 degrees to the plane of the advancing wedge face of the tooth to give a substantial inward, as well as a forward, direction to chips rebounding from it. As the tooth is used, the inner end portion of the front face 20 is worn down slightly. The grinding of the face 18 to sharpen the tooth will decrease the distance from the face 18 to the face 20 of the lip, and may increase the angle between these faces.

Having thus described my invention, I claim:

1. An insert type chisel tooth for circular saws having a chisel portion, and a narrowed locking portion extending inwardly therefrom to receive a locking shank, an inwardly protruding lip at the base of the chisel portion of the tooth, the side faces of which align with and form extensions of the side faces of the chisel portion, said side faces of the chisel portion tapering rearwardly to provide cutting clearance, said lip having its front face extended inwardly and forwardly substantially perpendicularly to the outer face of the chisel portion from the chisel portion beyond the adjacent edge of the locking portion that receives the shank the lip having its inner end terminating in front of the said adjacent edge of said locking portion whereby to overhang the shank and divert the incoming chips forwardly with respect to the shank before they contact the shank.

2. An insert type chisel tooth for circular saws, said tooth comprising a front chisel portion including an outer face and an advancing wedge face acutely angular to each other, said tooth further comprising a locking portion rearwardly of the chisel portion to engage in a seating recess at the saw surface and to interlock with a locking shank in said seating recess, the chisel portion having substantially planar side faces converging slightly rearwardly from the advancing face thereof to provide cutting clearance, said tooth having a deflecting lip that starts at the chisel portion rearwardly of the wedge face and in front of said locking portion and extends inward from the chisel portion in a direction substantially radially of the saw when mounted in the saw, said lip having its side faces meeting and forming co-planar extensions of the said side faces of the chisel portion in front of the locking portion, the lip having a front chip deflecting face that extends from the inner front surface of the chisel portion inwardly toward the saw axis and terminates in front of and overhangs that part of the locking portion that engages the outer end of the locking shank.

3. An insert type chisel tooth for circular saws, said tooth comprising a front chisel portion including an outer face and an advancing wedge face acutely angular to each other, said tooth further comprising a locking portion rearwardly of the chisel portion to engage in a seating recess at the saw surface and to interlock with a locking shank in said seating recess, the chisel portion having substantially planar side faces converging slightly rearwardly from the advancing face thereof to provide cutting clearance, said tooth having a deflecting lip that starts at the chisel portion in front of said locking portion and extends inward from the chisel portion in a direction substantially radially of the saw when mounted in the saw, said lip having its side faces meeting and forming co-planar extensions of the said side faces of the chisel portion, the lip having a front chip deflecting face facing forwardly and at an angle of more than a right angle to the wedge face of said chisel portion so as to deflect chips from said wedge face inwardly toward the saw axis and forwardly for travel with the saw, said lip having its inner end in front of the adjacent edge of the locking portion that receives the outer end of the shank whereby to overhang said outer end of the shank.

References Cited in the file of this patent

UNITED STATES PATENTS

| | | |
|---|---|---|
| 409,271 | Cardiff | Aug. 20, 1889 |
| 780,606 | Fox | Jan. 24, 1905 |
| 1,140,021 | Brown | May 18, 1915 |
| 1,687,448 | Hildreth | Oct. 9, 1928 |
| 1,936,242 | Orr | Nov. 21, 1933 |
| 2,623,553 | Dawson | Dec. 20, 1952 |
| 2,694,423 | Lawson | Nov. 16, 1954 |